United States Patent [19]

Noguchi

[11] Patent Number: 5,363,027
[45] Date of Patent: Nov. 8, 1994

[54] APPARATUS AND METHOD OF CONTROLLING THE ROBOTIC DRIVING OF A VEHICLE

[75] Inventor: Shinji Noguchi, Kyoto, Japan

[73] Assignee: Horiba, Ltd., Kyoto, Japan

[21] Appl. No.: 110,331

[22] Filed: Aug. 23, 1993

Related U.S. Application Data

[63] Continuation of Ser. No. 821,230, Jan. 16, 1992, abandoned.

[30] Foreign Application Priority Data

Jan. 16, 1991 [JP] Japan .................. 3-015766

[51] Int. Cl.⁵ .................. G05G 1/21
[52] U.S. Cl. .................. 318/573; 318/568.1; 318/266; 318/466; 364/424.1; 364/579; 74/335; 73/118.1; 446/460
[58] Field of Search .................. 318/560–646, 318/139; 395/80–89; 364/424.01–424.06, 426.01–426.04, 579, 550; 180/8.1–8.8, 316; 901/45, 50, 1, 3, 5, 9, 12, 15–23, 44, 46; 73/116, 117, 132, 12, 865.9, 866.4, 862.04, 172, 118.1, 661; 434/270, 274, 267; 29/407, 705; 446/279, 353, 427, 456, 460, 288

[56] References Cited

U.S. PATENT DOCUMENTS

| | | |
|---|---|---|
| 4,450,728 | 5/1984 | D'Angelo et al. |
| 4,541,060 | 9/1985 | Kogawa .................. 318/574 X |
| 4,554,824 | 11/1985 | King et al. .................. 73/132 X |
| 4,625,285 | 11/1986 | Mori et al. .................. 901/2 |
| 4,641,251 | 2/1987 | Inoue .................. 901/1 |
| 4,689,756 | 8/1987 | Koyama et al. .................. 318/573 X |
| 4,742,720 | 5/1988 | Storck .................. 73/865.9 |
| 4,799,915 | 1/1989 | Lehmann et al. .................. 446/460 X |
| 5,012,689 | 5/1991 | Smith .................. 74/89.17 |
| 5,035,158 | 7/1991 | Leigh-Monstevens .................. 74/866 |
| 5,042,133 | 8/1991 | Peterson et al. .................. 29/407 |
| 5,060,176 | 10/1991 | Nawa et al. .................. 364/579 |
| 5,085,071 | 2/1992 | Mizushina et al. .................. 73/118.1 |
| 5,089,963 | 2/1992 | Takahashi .................. 364/424.1 |
| 5,142,903 | 9/1992 | Mizushina et al. .................. 73/118.1 |
| 5,161,422 | 11/1992 | Suman et al. .................. 74/335 |
| 5,172,589 | 12/1992 | Witt .................. 73/132 |

FOREIGN PATENT DOCUMENTS 0381598 1/1990 European Pat. Off. .

OTHER PUBLICATIONS

Automobiltechnische Zeitschrift 88 (1986) 7/8, pp. 417–419.
Technische Rundschau 28 (1989), pp. 38–43.

Primary Examiner—Paul Ip
Attorney, Agent, or Firm—Price, Gess & Ubell

[57] ABSTRACT

A method and apparatus for automatically operating the controls of a vehicle and, more specifically, a gearshift lever pattern in a manual transmission to determine an envelope of movement of the gearshift lever, is provided. X and Y motors can be operatively attached to a manual gearshift lever with appropriate encoders to determine positions. A computer circuit controls an automatic learning cycle of movement of the gearshift pattern, while appropriately storing the spatial positions of the gearshift lever, to thereby enable an automatic driving of the gearshift during an automatic operation of the vehicle in a controlled situation.

17 Claims, 15 Drawing Sheets

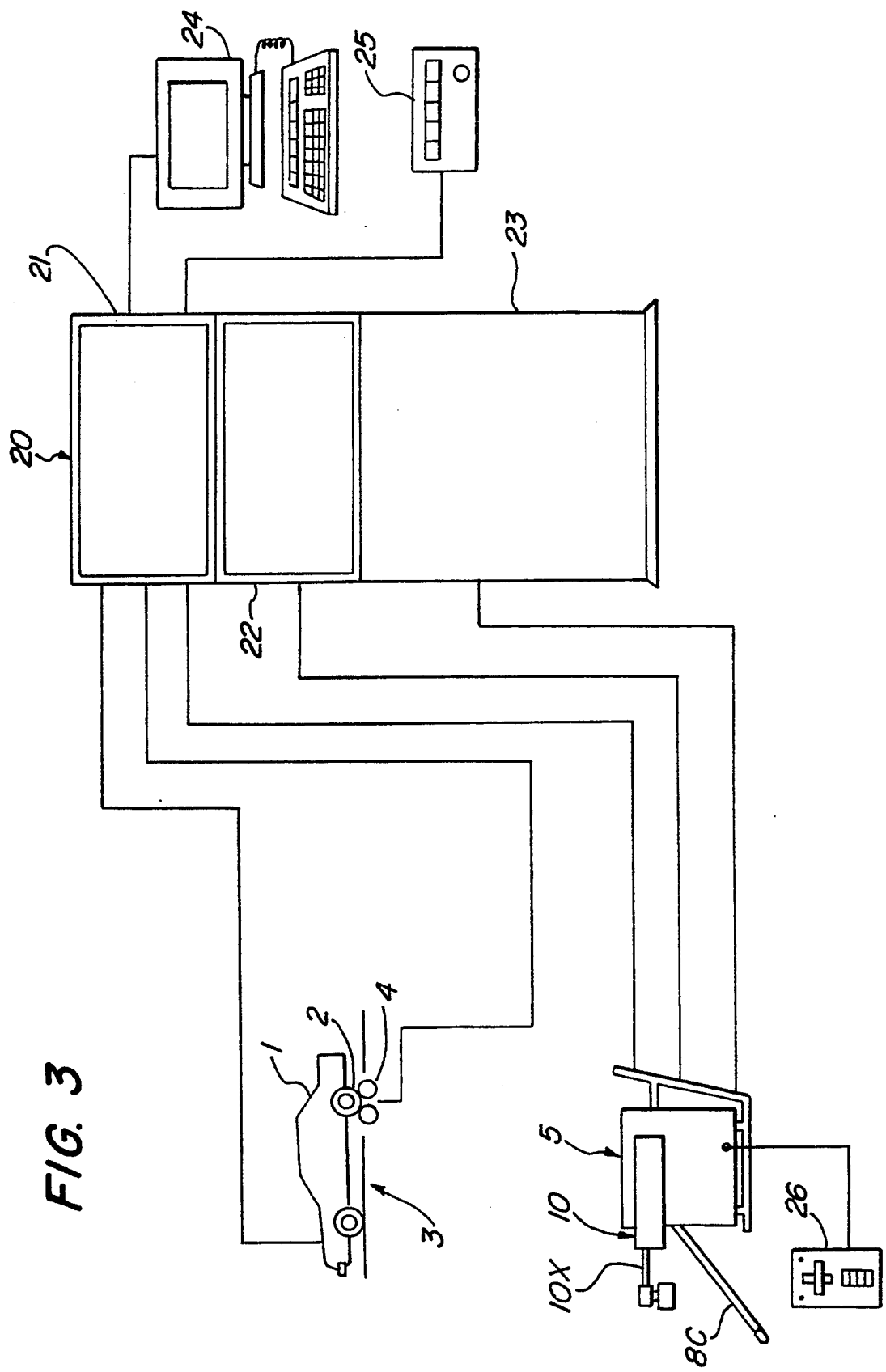

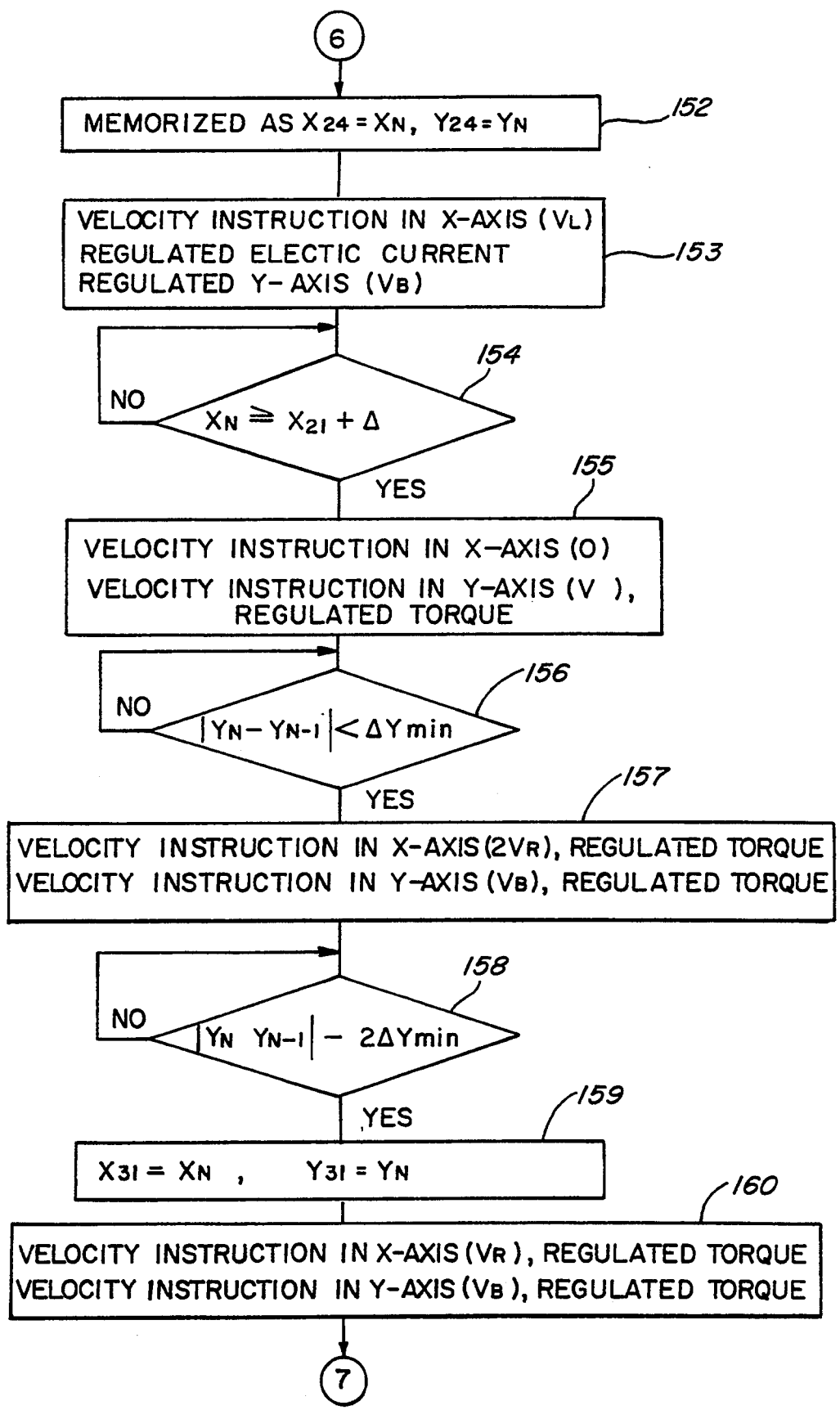

APPARATUS AND METHOD OF CONTROLLING THE ROBOTIC DRIVING OF A VEHICLE

This is a continuation of application Ser. No. 07/821,230, filed on Jan. 16, 1992, now abandoned.

BACKGROUND OF THE INVENTION

1. Field of the Invention

The present invention relates to an apparatus and method of controlling an automatic driving robot for a vehicle to enable the automatic driving of a vehicle in a drive-simulating operation and, more particularly, to an automatic driving robot and method of performing a dynamic roadability test of a vehicle with driving wheels contacting the rotary drum of a chassis dynamometer.

2. Description of Related Art

As the propulsion systems of vehicles become more complex and sophisticated, and as environmental concerns require tighter regulation of the emission of pollutants and combustion gases, there has been a demand to provide adequate testing facilities with objective standards for performance of a vehicle. The prior art has been aware of the use of a chassis dynamometer to create an automobile or vehicle driving simulated operation to more closely control an objective standard for a dynamic roadability test.

In an effort to remove the subjective characteristics of a human operator, attempts have been made to replace the human operator with an automatic driving robot so that a plurality of mechanical actuators, for example, driven by oil pressure, air pressure, electric motor, etc., can be utilized to carry out an activation of the accelerator pedal, brake pedal, clutch pedal, and the like, and a corresponding shifting of the shift lever.

As can be appreciated, the operation of these pedals and the shift lever are frequently interrelated. For example, it is necessary to provide a changeover operation of the gearshift lever at a change of speed in addition to activating the appropriate accelerator pedal, brake pedal, and clutch pedal. In coordinating these activities, the prior art has frequently resorted to manual shifting by a human operator of the actuator for driving the gearshift lever, with the visual conformation of the position of the gearshift lever, and then a subsequent memorization of the coordinates in the control system of the driving robot, in order to enable the driving robot to, in effect, learn the various shift position maneuvers.

As can be appreciated, a degree of subjective judgment must be utilized in this training procedure, and a considerable amount of time is expended in a trial and error procedure to accomplish this task. Since ideally the automatic driving robot will be able to service different vehicles, this problem can be both troublesome and relatively expensive in implementing a dynamic roadability test.

SUMMARY OF THE INVENTION

The present invention provides an apparatus for automatically operating the controls of a vehicle and, more particularly, a robotic driving apparatus that can activate the operator controls of the vehicle, including a manual gearshift lever which can be easily programmed in an objective manner. The robotic apparatus can control the various operator pedals, such as the accelerator pedal, brake pedal, and clutch pedal, and can further move the manual gearshift lever through a shift pattern in an XY-coordinate system. The gear shifting apparatus can include a first motor for driving the shift lever in an X direction, along with an appropriate sensing encoder to determine the actual position of the motor. In addition, the velocity or speed of the motor can be monitored.

The shift lever can also be moved in the Y direction by a second motor and an appropriate sensing encoder. The operator can activate the respective first motor and second motor to repetitively move the gearshift lever through the shift pattern, and to determine an operative displacement, both along the path of movement of the shift pattern, and also traverse to the path of movement of the shift pattern, to determine the mechanical limits or tolerances of permissible movement. These limits of movement can be memorized and can be processed to define a centerline for the gearshift lever movement. For example, if the gearshift lever reaches a mechanical stop to limit its movement in, for example, the X direction, this value can be memorized, and the gearshift lever can be moved back a predetermined amount. The gearshift lever is then activated in a traverse movement, for example, in the Y direction, until it reaches its maximum limit. This value can then be memorized.

Again, the gearshift lever can be reversed in movement by a predetermined direction. The gearshift lever can then be moved respectively to the limits of the X direction to determine the permissible limits of traverse movement possible in the shift pattern. These values can be memorized and processed to define a centerline movement for the gearshift lever.

The gearshift lever can then be moved, for example, in the Y direction, while being biased in the X direction toward the next torque-reducing gear position, to define a demarcation point from that shift pattern. This procedure can be repeated throughout each of the gear strokes that make up the overall manual gearshift pattern to, in effect, provide coordinates defining an envelope of permissive gearshift lever movement for that particular shift pattern.

An optimum position pattern can then be stored in memory for implementing the desired shifting of the manual gear lever. This apparatus can be implemented by a method of determining the automatic operation of the controls of the vehicle having robotic controls by automatically and repetitively moving the gearshift lever to determine an operative displacement of the gearshift lever in the shift pattern, both in a movement along the shift pattern and traverse to the shift pattern, to thereby define the envelope of permissible gearshift movement. The maximum limits of this movement can then be adjusted along the shift pattern and traverse to the shift pattern in accordance with a predetermined algorithm which would permit a definition of the optimum shift pattern. These optimum shift pattern values can be memorized to define the XY-coordinates in the manual shift pattern.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 3 is a schematic block diagram showing the relationship of the driving robot to the vehicle and computer controls;

FIGS. 7A to 7I collectively disclose a schematic flow chart for automatically determining a shift pattern.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a method and apparatus for automatically shifting a vehicle gearshift lever.

Figure 4A:
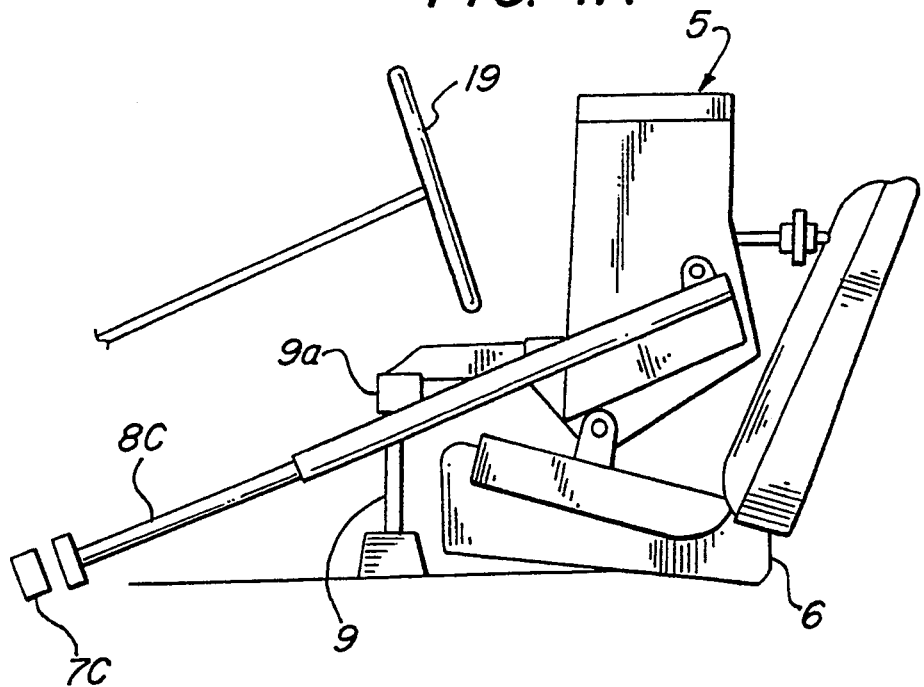
FIG. 4(A) is a schematic side view of a driving robot body.
Figure 4B:
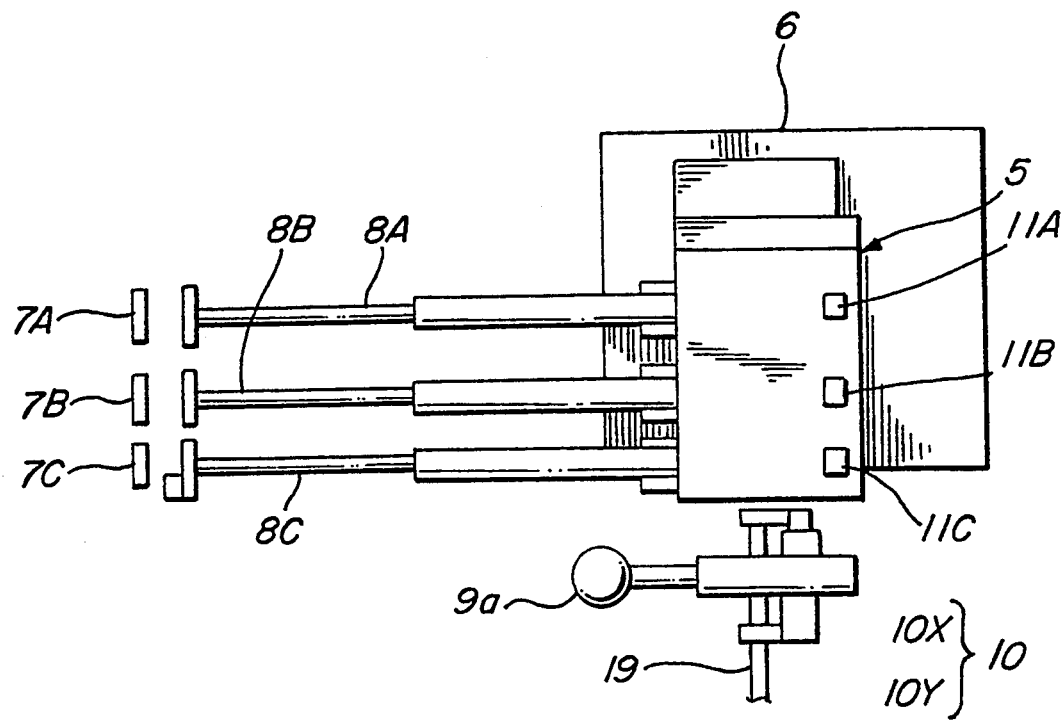
FIG. 4(B) is a schematic side view of a driving robot body mounted on a vehicle seat.

Referring to FIG. 3, a block diagram illustrating the system and apparatus for controlling a dynamic roadability test of a vehicle 1 is disclosed. The vehicle 1 is operatively positioned with its driving rear wheels 2 on a chassis dynamometer 4 so as to engage the dynamometer roller 4. The computer system 20 can receive inputs from various sensors, and can also activate the controls, such as the speed of the dynamometer roller 4. The computer system 20 can also activate a driving robot 5, which can be mounted on an operator seat 6, for example, as seen in FIGS. 4(A) and 4(B). The disclosure of U.S. Pat. Nos. 4,327,578 and 4,450,728 are incorporated herein by reference to supplement the present disclosure for background information.

The driving robot body 5 is provided with a series of actuator members 8A, 8B, and 8C for use, respectively, in controlling the position of the accelerator pedal 7A, brake pedal 7B, and clutch pedal 7C. Additionally, an actuator portion 10 can be used for controlling the manual gearshift lever 9 to effectuate a shift in position of the gearshift lever commensurate with the desired torque output from the vehicle. The actuator portions 8A, 8B, and 8C can be individually driven by, for example, a DC servomotor 11A, 11B, and 11C, respectively. Additionally, each of the actuators can be provided with a proximity switch and an encoder for detecting the position of these actuators, respectively. The driving torque, I, put out from the motors, that is, the thrusts in the directions of the X- and Y-axes, are regulated by regulating the electric current driving the respective motors. The amount of torque can be predetermined.

Figure 2:
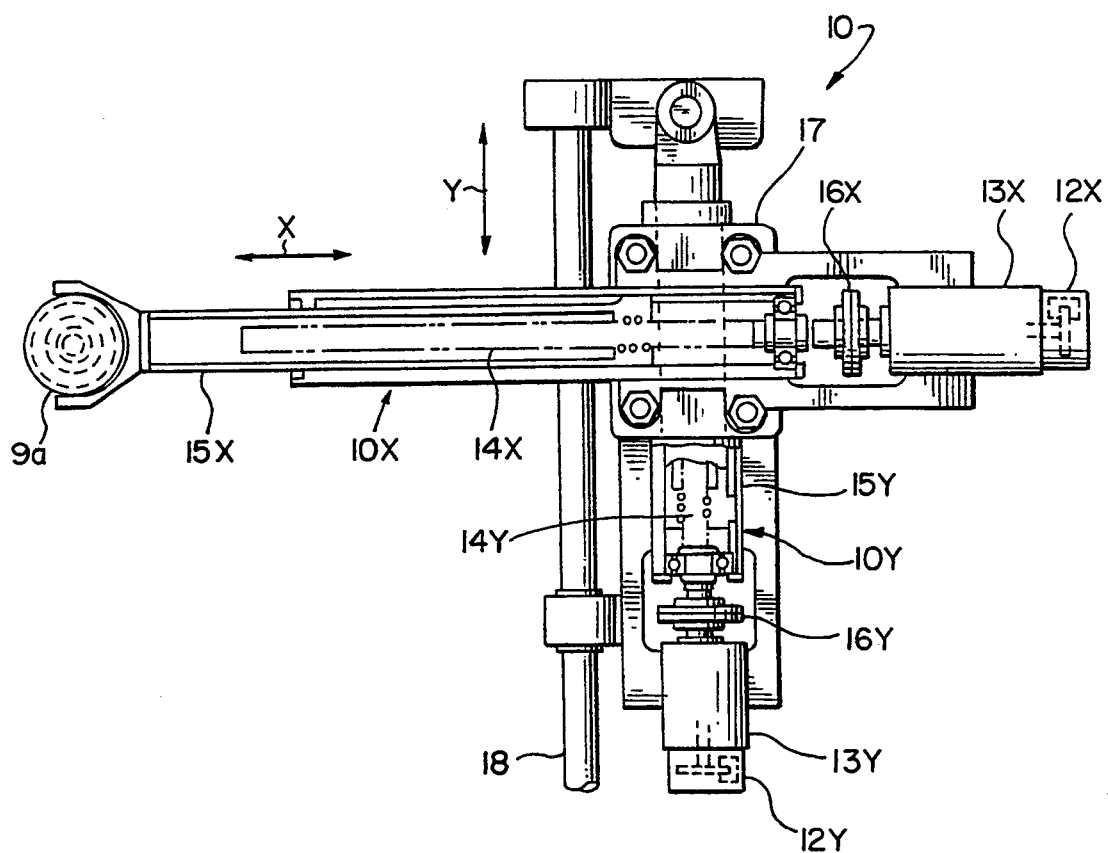
FIG. 2 is a schematic plan view disclosing the mechanical construction of an actuator for use in a gearshift lever movement.

Referring to FIG. 2, the gearshift actuator portion 10 is disclosed in detail. An X-axis actuator portion 10X has a claw or yoke for manually grasping or securing the shift grip 9A to enable the actuator portion to shift the gearshift lever 9 in both an X-axis direction (the direction shown by both arrows X) and a Y-axis direction (the direction shown by both arrows Y). The Y-axis actuator portion 10Y can move the entire X-axis actuator portion 10X in the direction of the Y-axis, which is traverse or perpendicular to the direction of the X-axis. The X-axis actuator portion 10X comprises a DC servomotor 13X that is further provided with an encoder 12X. The X-axis actuator 15X engages with a ball screw force transmitter 14X which, in turn, is connected to the shift grip 9A. A coupling 16X mechanically connects the DC servomotor 13X with the ball screw 14X, while the Y-axis actuator portion 10Y comprises a DC servomotor 13Y provided with an encoder 12Y. The Y-axis actuator 15Y engages with the ball screw 14Y and is mechanically connected with the base portion 17 on which the X-axis actuator portion 10X is carried.

A coupling 16Y connects the DC servomotor 13Y with a ball screw force mechanism 14Y. The housing portion for the Y-axis actuator portion 10Y is journalled onto a guide member 18. The respective encoders can take various configurations and can comprise a light monitor with a slotted disk configuration.

As noted in FIG. 3, the computer control system 20 controls the chassis dynamometer 3 and the driving robot 5, and can further provide an interface control with an operator through a work station 24 comprising a CRT and input keyboard, and can also be interconnected with a servodriver circuit 22 and a power source portion 23. A remote controller 25 can be further utilized while an operator pendant 26 can be used in the teaching mode of operation.

The pendant 26 is a control switch for operating the respective actuators in order to confirm that they are operatively connected to the accelerator, brake, and clutch when the robot body 5 is mounted on the driver's seat. In addition, the pendant 26 can function as a manual pendant for shifting the actuator in the X- and Y-axes to hold the shift lever 9 at a neutral position.

To enable a change in the shift position of the gearshift lever 9, a predetermined electric current can be passed through the DC servomotor 13X in the X-axis actuator portion 10X, and also the DC servomotor 13Y in the Y-axis portion 10Y, to thereby enable the respective positions of the actuators 13X and 13Y to be determined by the encoders 12X and 12Y, respectively. These detected output signals on position can then be compared with position instruction signals that can be provided to a P control (Proportional control), for example, from a predetermined driving control program. The differences between the detected outputs and the specific positional instructions can then be used to drive the driving robot. To enable such control to be achieved through the driving robot, a method of defining the envelope of the shift pattern movement is accomplished in the present invention.

The gearshift lever 9, in the present invention, can be shifted in the respective X- and Y-axis directions, which will universally include the degrees of movement necessary for manual shift patterns. This movement of the gearshift lever 9 is accomplished by controlling the electric current passing through the DC servomotors 13X and 13Y to conform the permissible shiftable range thereof. Operative positions in this shiftable range are memorized to thereby enable an automatic learning or encoding of the shift positions of the gearshift lever 9.

Figure 1:
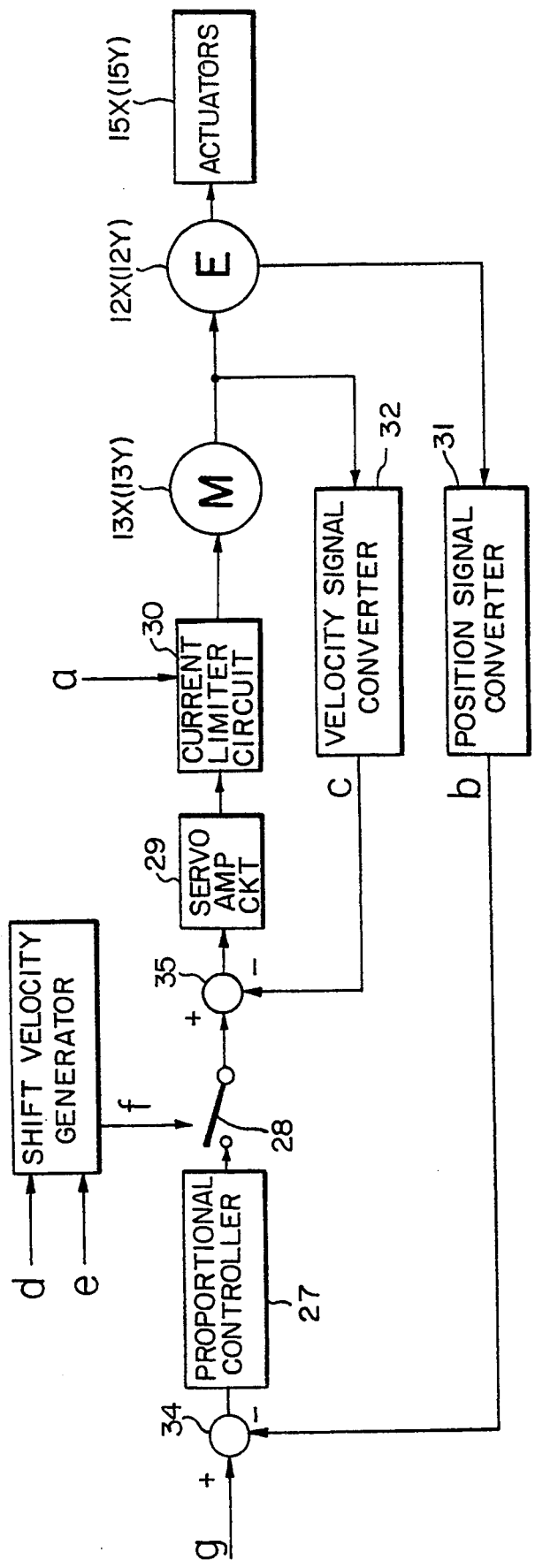
FIG. 1 is a schematic block diagram disclosing the construction of the control system for a robotic actuator portion of a gearshift lever that can be used in the method of controlling a driving robot according to the present invention.

A control system for this actuator portion 10 for controlling the gearshift lever is shown in a schematic form in FIG. 1. A proportion control or P control system 27 can receive position control signals from an outside source which can be appropriately modulated or adjusted through the feedback interface of the butt point 34.

A changeover switch 28 connects the P control system 27 and a shift velocity instruction generator with a servoamplifier circuit 29. The shift velocity instruction generator 33 generates a velocity instruction signal (f) on the basis of an output (d) from a proximity sensor and a shift pattern (e) (which will be described later).

The changeover switch 28 normally connects the P control system 27 with a servoamplifier circuit 29, and the switch 28 can also connect a shift velocity instruction generator 33 with the servoamplifier circuit 29 during the automated shift position learning. The changeover switch 28 is normally connected with the g signal side to carry out proportional control on the basis of the difference between the required target positional instruction g and the detected positional signal b, but in the case of an automatic learning cycle, the switch 28 is connected with the f side to provide the actuators with a velocity instruction (moving direction instruction) f corresponding to the particular step in the learning cycle. The actual velocity is then decided depending upon the output of the P control system 27 and the output 33.

The output of the servoamplifier circuit 29 is connected to a current limiter circuit 30, which limits the electric current passing through the DC servo-motors 13X and 13Y on the basis of a limited current instruction signal (a).

The upper limit velocity of the actuator is determined by the velocity instruction, and the operating power of the actuator is determined by limiting the electric current.

If the friction during the shifting movement at the setup velocity is smaller than the operating power of the actuator, the shifting velocity becomes equal to the setup velocity, while the shifting velocity is reduced until the operating power is balanced with the frictional force if the friction becomes larger than the operating power of the actuator. Also, the accelerating time at the start of the movement is varied, depending upon the degree of the limitation of the electric current.

Usually, a limited velocity value (instructed velocity) is about 15 mm/sec to 30 mm/sec. The shifting movement is stopped at the velocity instruction of zero, while the shifting movement is reversed in direction if the polarity of the velocity is reversed.

Respective motors 13X and 13Y are capable of driving the X-axis actuator 15X and the Y-axis actuator 15Y with the encoders (e) 12X and 12Y monitoring the position of the actuators.

A velocity signal converter 32 can monitor the velocity of the DC servomotors for providing a detected velocity signal (c) on the basis of the output of velocity sensors (not shown) provided with regard to each of the DC servomotors. This velocity signal (c) is summed back in at the butt point 35 to modulate the input to the servo-amplifier circuit 29. Thus, the velocity instruction signal (f) and the detected velocity signal (c) are utilized in the feedback system.

Figure 5A:
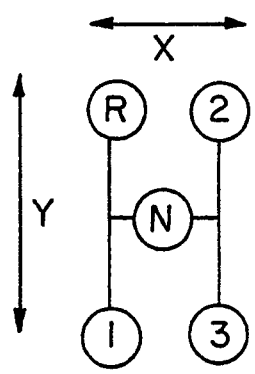
FIGS. 5(A)-5(I) disclose various manual shift patterns for vehicles having manual transmissions.
Figure 5B:
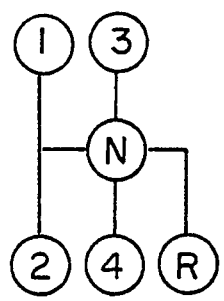
Figure 5C:
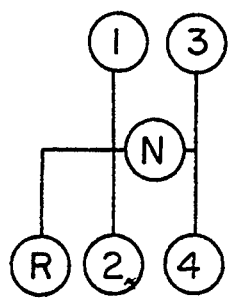
Figure 5D:
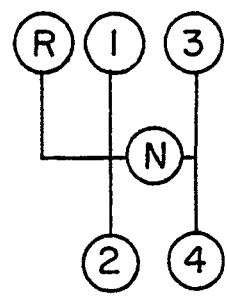
Figure 5E:
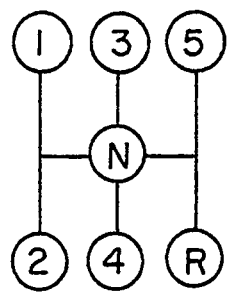
Figure 5F:
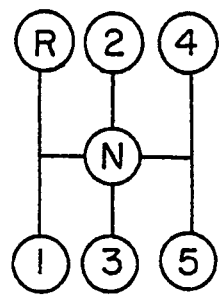
Figure 5G:
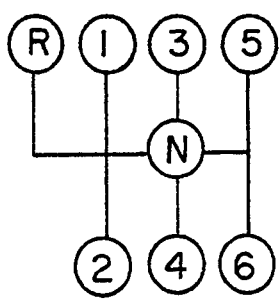
Figure 5H:
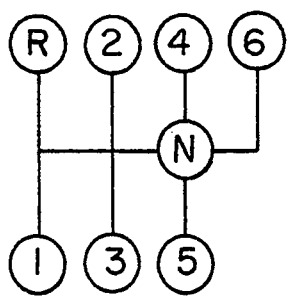
Figure 5I:
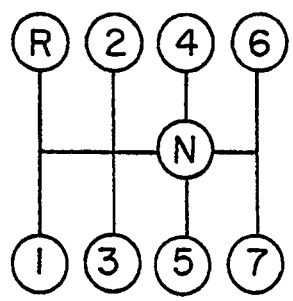

Referring to FIGS. 5(A)–5(I), various shift patterns commonly experienced in manual transmission vehicles are disclosed. In general, the gearshift lever 9 is shifted so as to be guided by the grooves of the shift patterns. The actual permissible mechanical movements of the shift lever, or the envelope of permissible movement in accordance with these patterns, can vary with regard to individual vehicles. FIG. 5(A) discloses a three-speed or velocity shift pattern having, besides reverse, first, second, and third gears, with a neutral position being centrally located. FIGS. 5(B)–5(D) disclose four-velocity shift patterns. FIGS. 5(E) and 5(F) disclose a five-velocity shift pattern. Finally, FIGS. 5(G)–5(I) disclose a six-velocity shift pattern, respectively.

The procedure of automatically defining the travel positions for the gearshift lever 9 during the learning mode with regard to the various shift patterns disclosed in FIG. 5 will be described relative to FIGS. 6(A) and 6(B). To prevent repetition, an illustrative sequence of driving patterns of the respective DC servomotors 13X and 13Y through a common shift pattern path of movement will be illustratively disclosed with the understanding that these steps of moving, computing positional coordinates, and memorizing these coordinates can be repeated for any specific shift pattern.

Figure 6A:
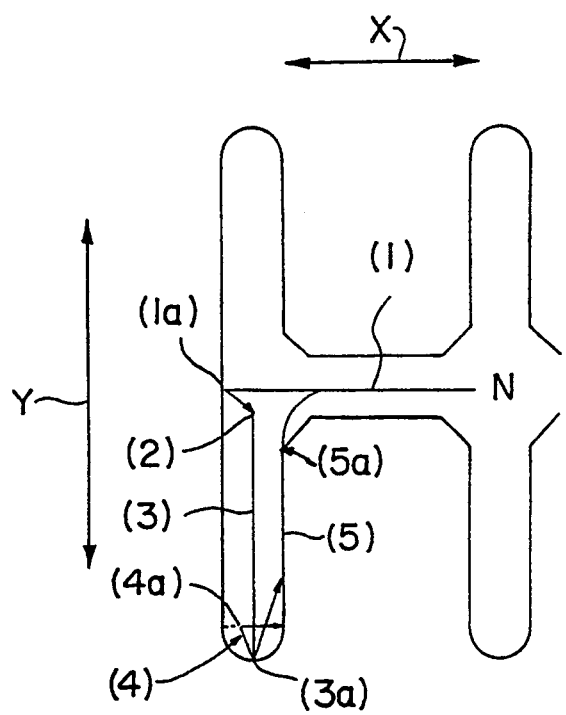
FIGS. 6(A) and 6(B) are illustrative diagrams for describing the instructional operation of the driving robot in an illustrative shift pattern.
Figure 6B:
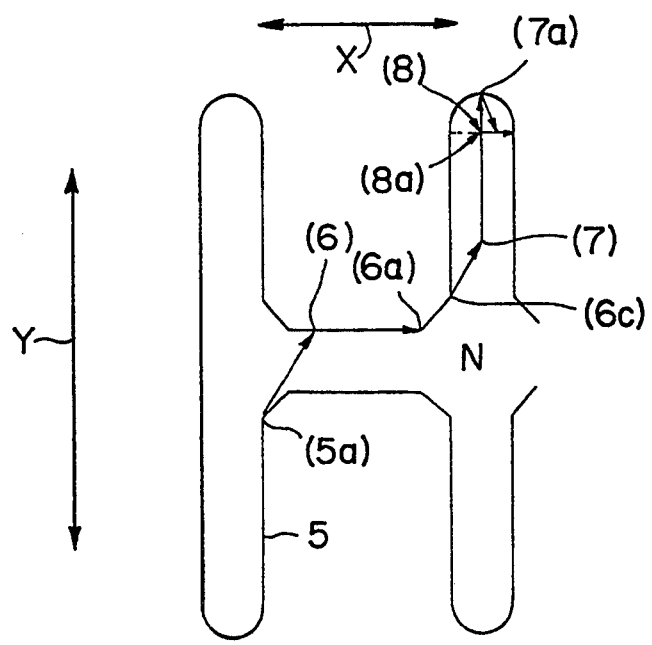
Figure 7A:
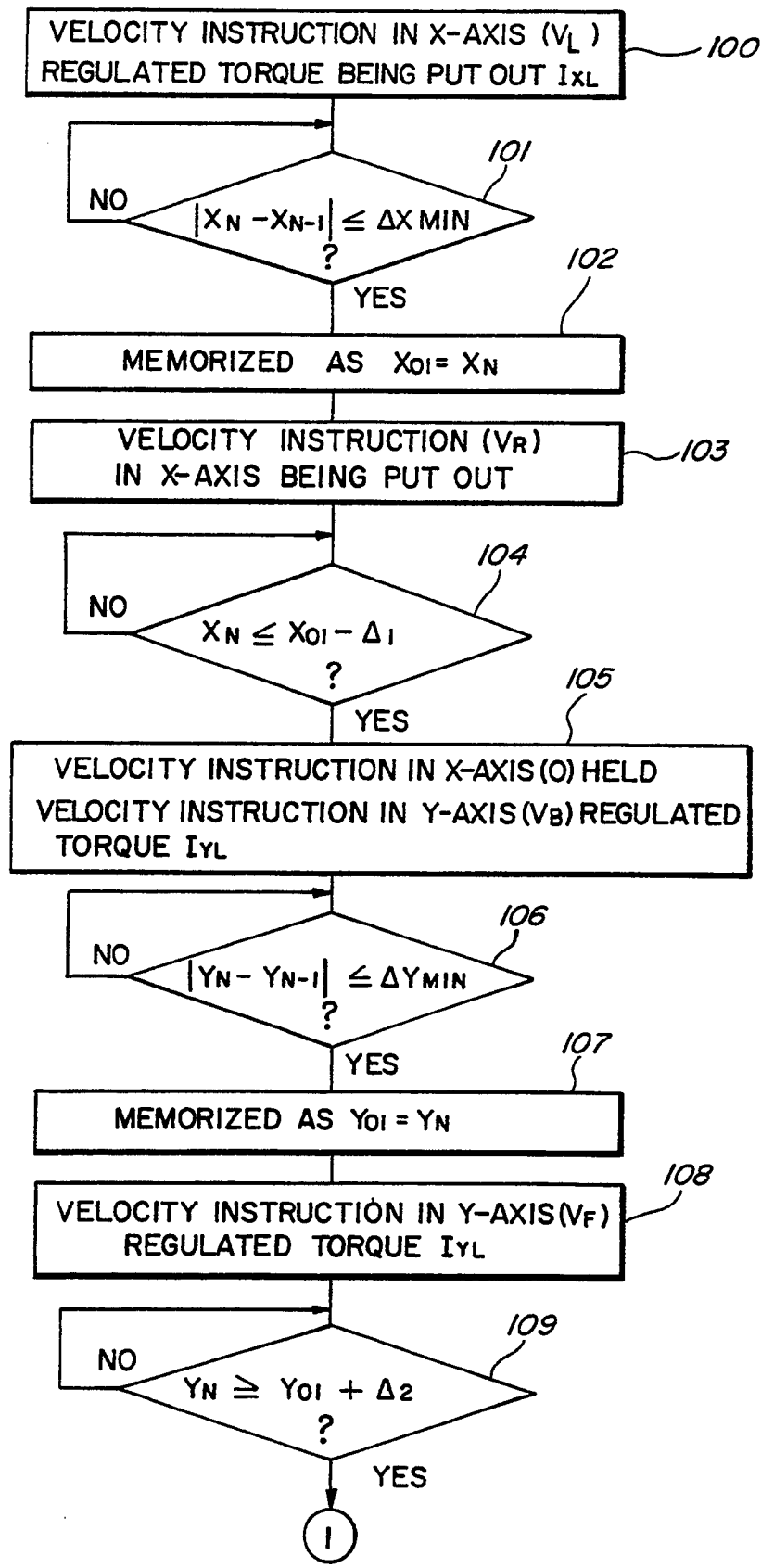
Figure 7B:
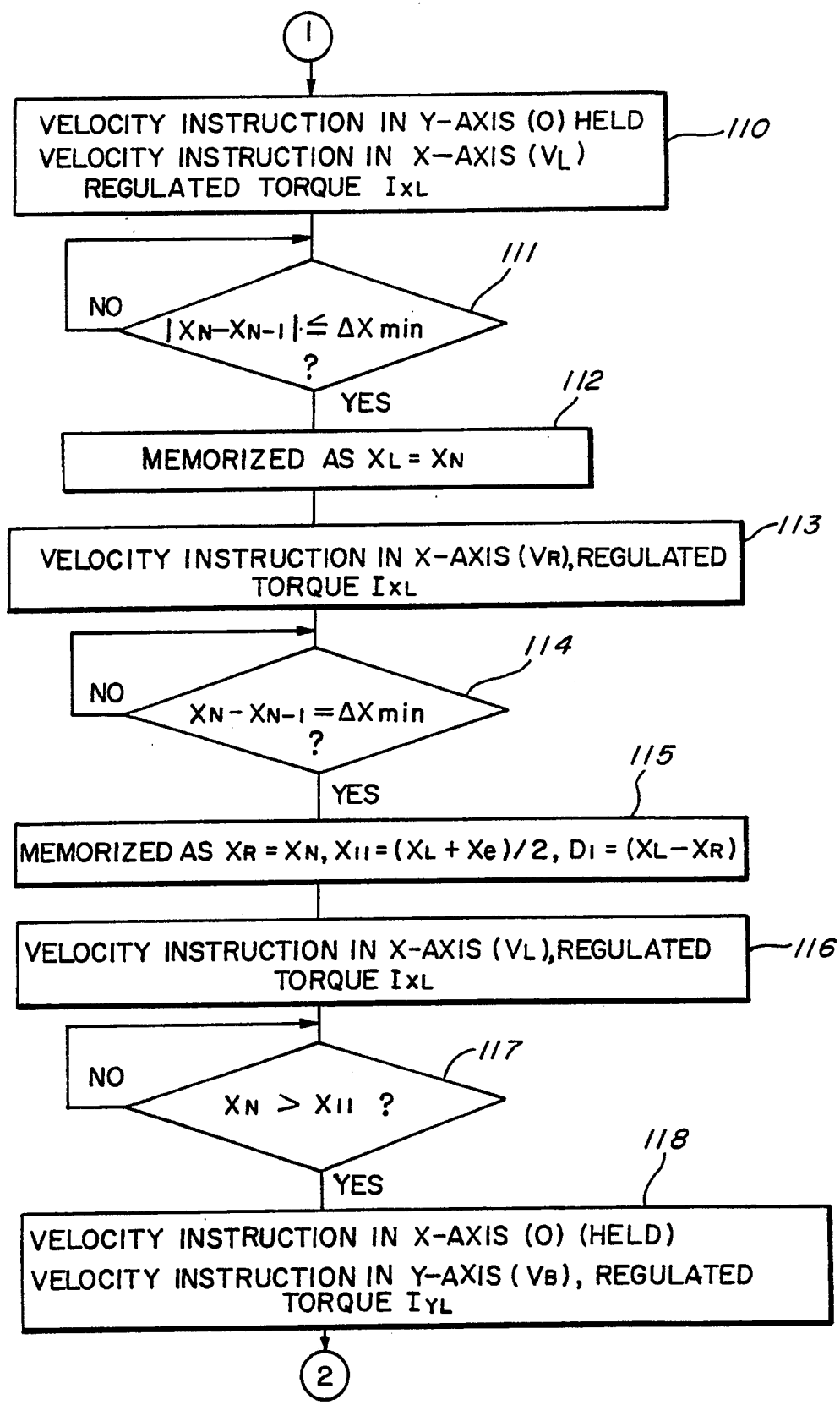
Figure 7C:
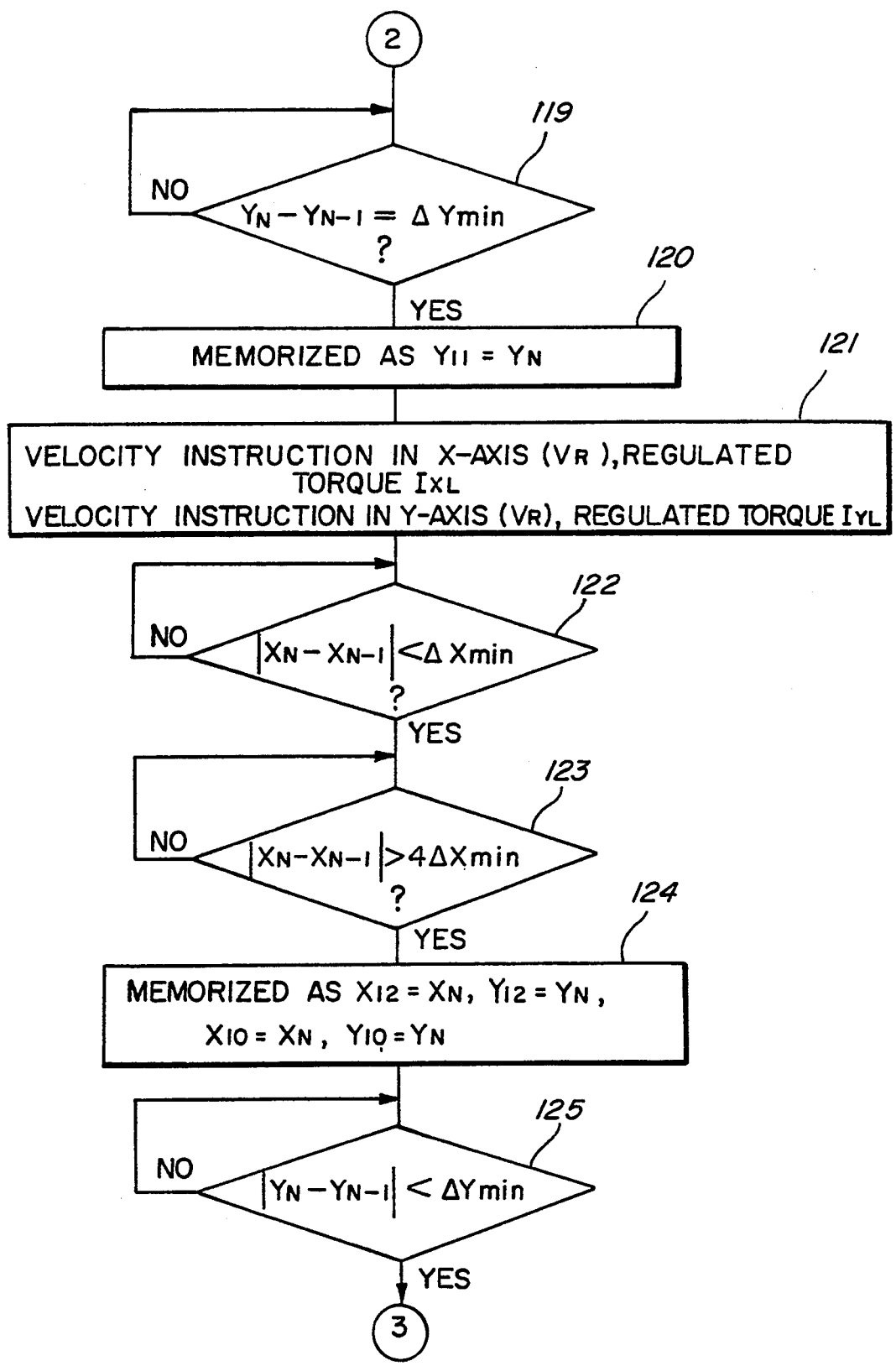
Figure 7D:
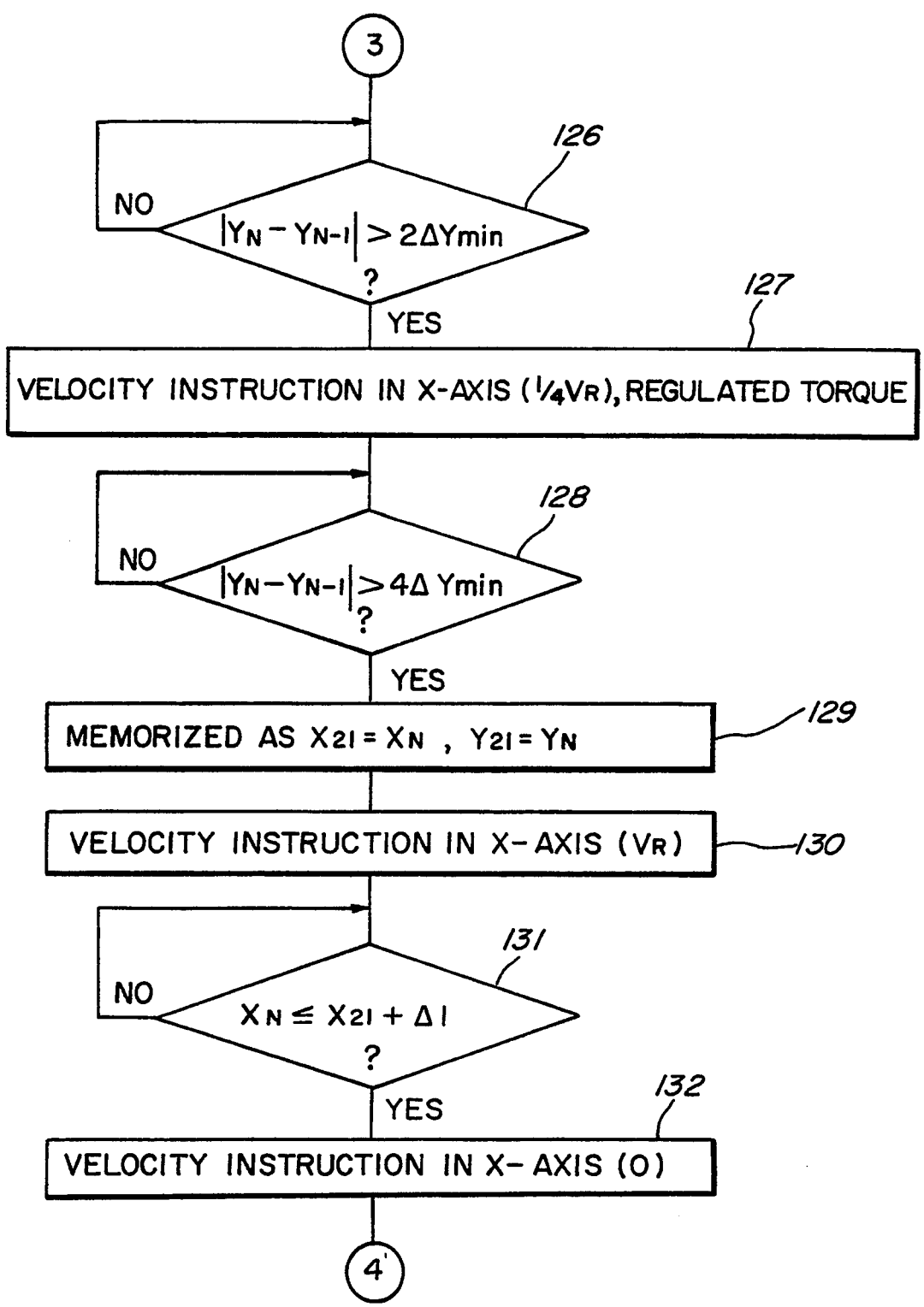
Figure 7E:
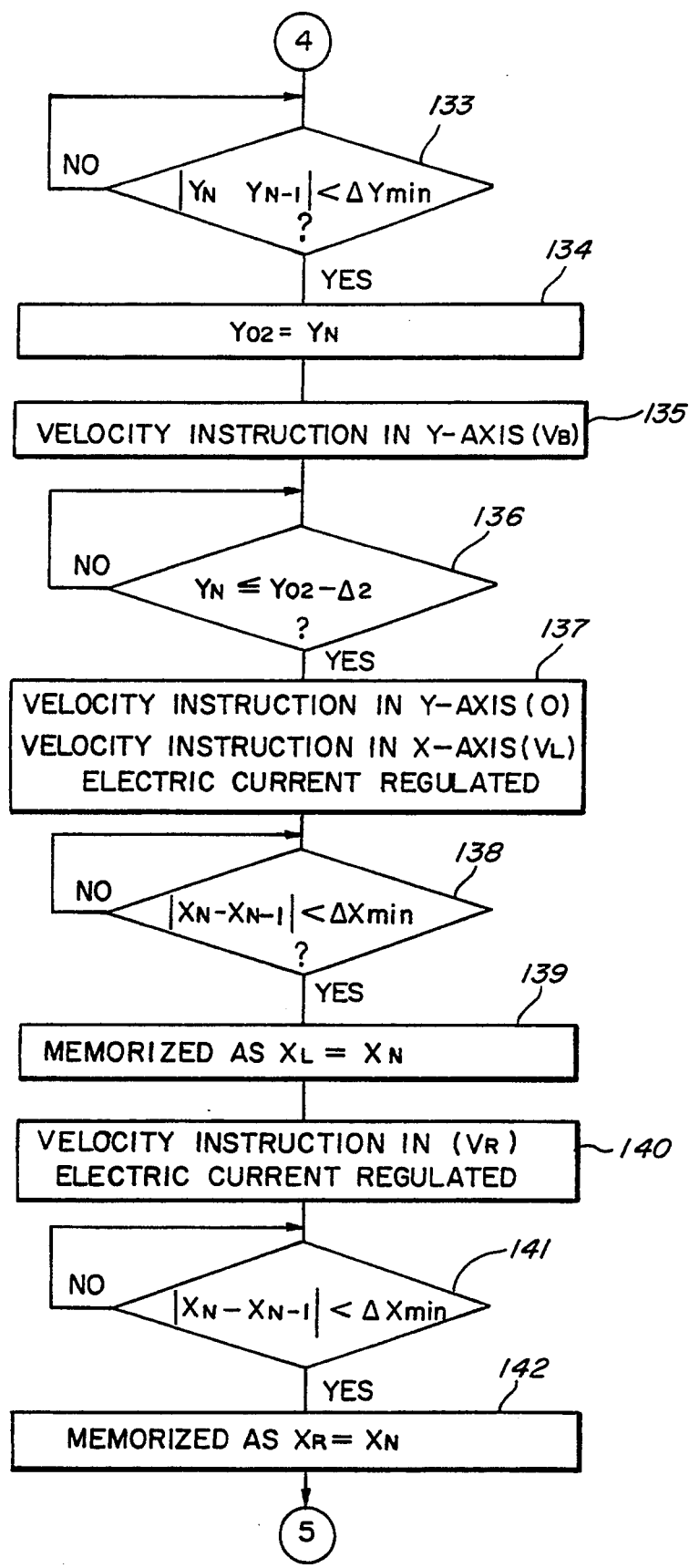
Figure 7F:
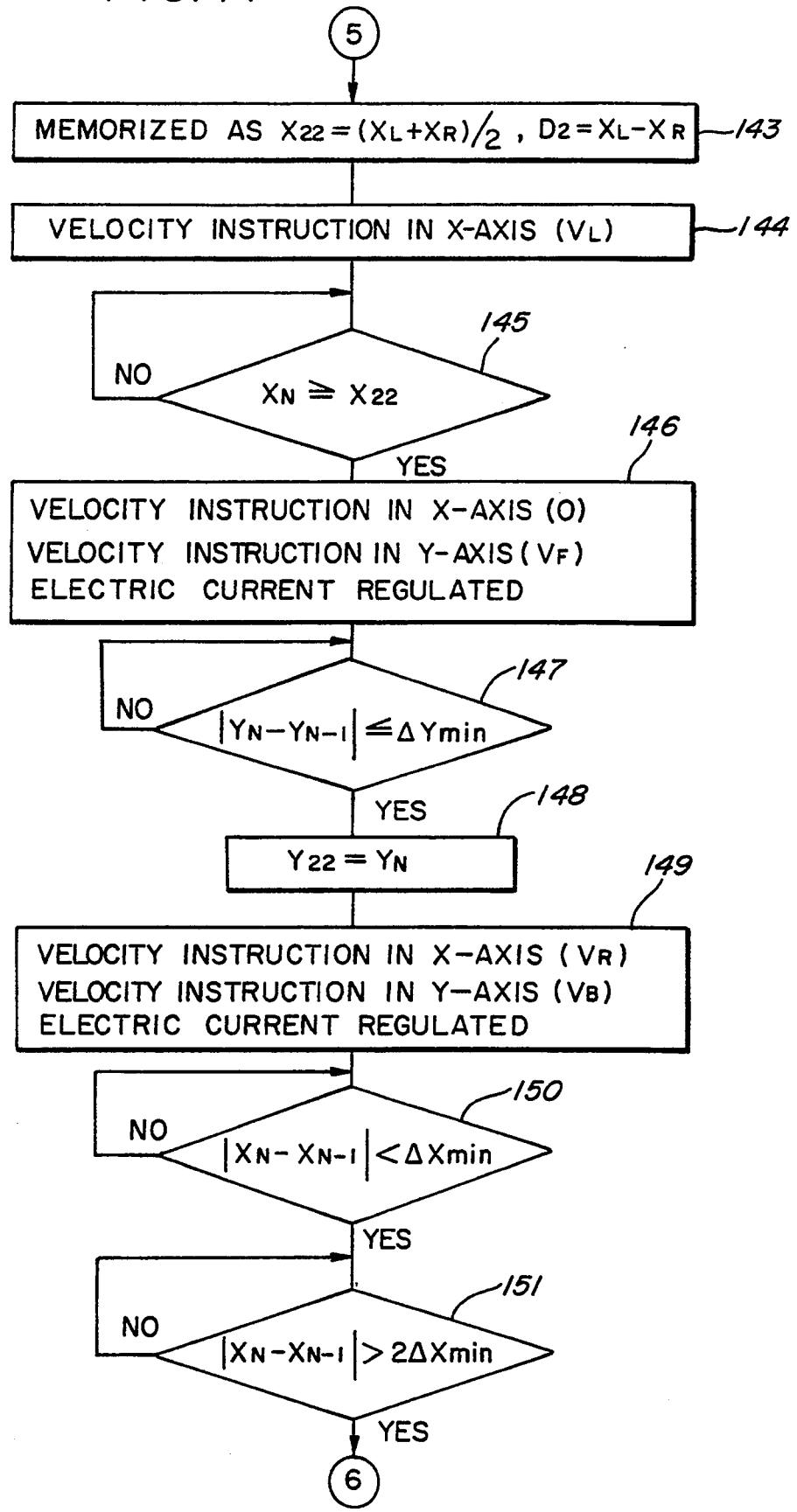
Figure 7H:
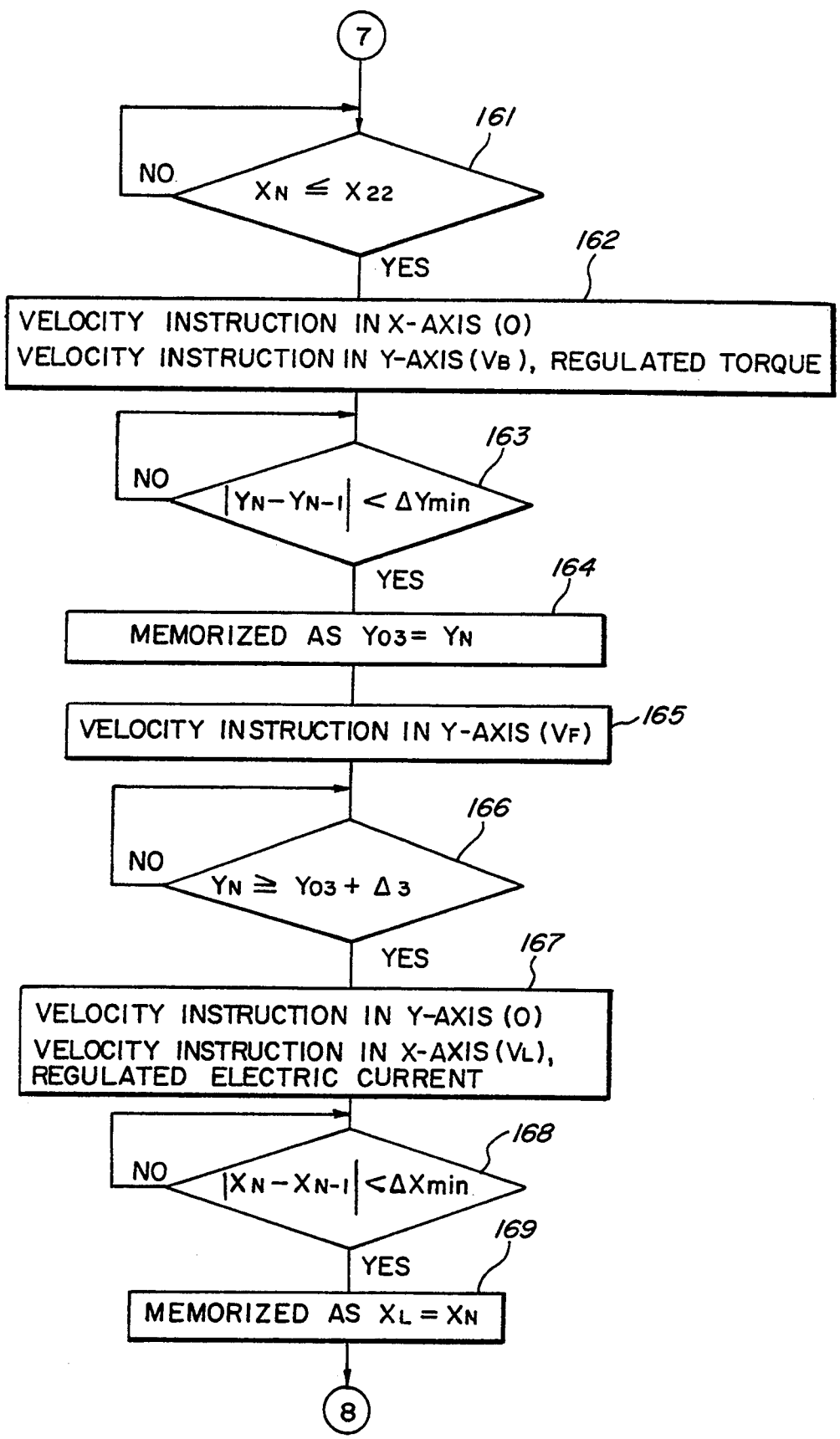
Figure 71:
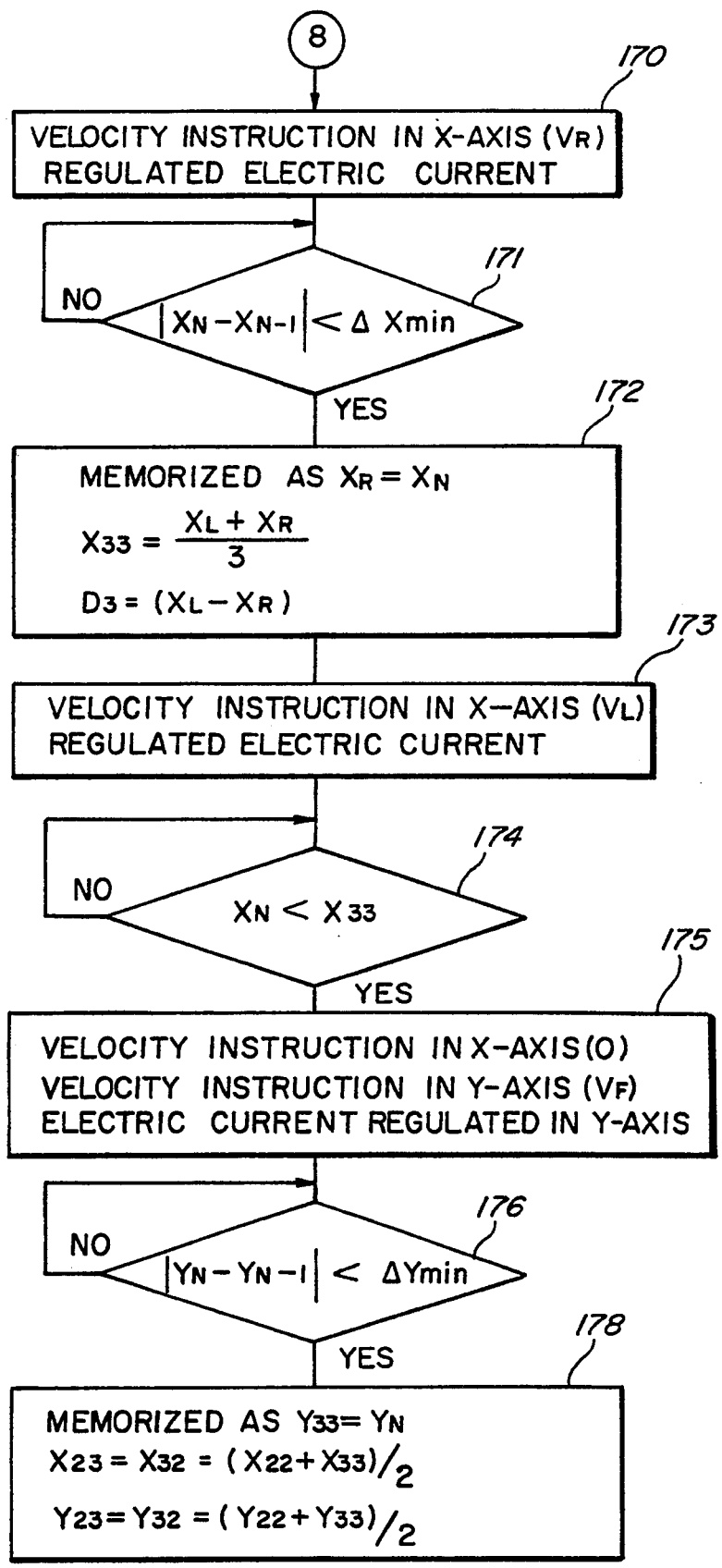

First referring to the case of the shift pattern of FIGS. 5(A), 5(F), 5(H), and 5(I), which basically disclose the first gear at the lower left-hand side of the drawings and the second gear at the upper right-hand direction of the drawings:

[1] The case of the shift patterns (A), (F), (H), (I):

(0) The gearshift lever 9 is initially positioned in neutral (N) (see FIG. 6(A) and the flow chart of FIGS. 7A to 7I) and the clutch pedal 7(C) is depressed and a position ($X_{00}$, $Y_{00}$) of the shift grip 9a is read.

(1) The shift grip 9a is fastened to the X-axis actuator 15X of the actuator portion 10 and the X-axis actuator 15X is shifted in the X direction to the left of the drawing from the neutral position in accordance with a velocity instruction $V_L$ (see step 100). This movement continues until the position $X_{01}$ is determined at decisional step 101.

(1a) At the limit of the gearshift lever travel to the left, an X-coordinate position ($X_{01}$) is then automatically stored and memorized at step 102. This establishes the outer envelope of leftward movement to the X direction from the neutral position.

(2) With the gearshift lever 9 located at the extreme position on the left-hand side of the X direction in the neutral position, the gearshift lever 9 is then automatically relocated by a predetermined position $\Delta_1$ to the coordinate position $X_{01} - \Delta_1$. $\Delta_1$ and $\Delta_2$ are empirically predetermined based on the specific vehicle to be measured. This relocation is shown by the velocity instruction $V_R$ of step 103, which is the velocity for shifting rightward in the X-axis, and the decisional step 104.

(3) The gearshift lever 9 is now moved downward in the Y-axis direction towards the first gear engagement position (see step 105). $V_B$ is the velocity instruction for shifting rearward on the Y-axis.

(3a) A Y-coordinate $Y_{01}$ is established when the gearshift lever 9 cannot be moved any further downward in the direction of the Y-axis (see step 106). This coordinate value is then memorized (see step 107).

(4) The gearshift lever is now shifted in a reverse movement by a predetermined displacement of $\Delta_2$ to a new coordinate position $Y_{01} + \Delta_2$ (see steps 108 and 109). $V_F$ is the velocity instruction for shifting forward on the Y-axis. These slight predetermined movements from the limits of the travel movement of the gearshift lever are to ensure that the gearshift lever is comfortably within the envelope of the shift pattern for the particular vehicle.

(4a) The torque is reduced on the DC motor 13X to shift the gearshift lever 9 to the left and an X-coordinate of a position, where the gearshift lever 9 is stopped, is memorized as $X_L$. Subsequently, the torque is also reduced to shift the gearshift lever 9 to the right and an X-coordinate of a position, where the gearshift lever 9 is stopped, is memorized as $X_R$. This establishes the width of traverse movement for the first gearshift pattern (see steps 110 to 114).

(4b) $X_{11}$, $D_1$ determined from $X_{11}=(X_L+X_R)/2$ and $D_1=(X_L-X_R)$, respectively, are memorized and the gearshift lever 9 is shifted to a position of $X_{11}$, which is in the middle of the shift pattern (see step 115).

(4c) The torque is reduced on the DC motor 134 to shift the gearshift lever 9 to the rear or bottom of the Y-axis, and a Y-coordinate $Y_{11}$ of a point, where the gearshift lever 9 is incapable of being shifted in the direction of the Y-axis, is memorized (see steps 116 to 120).

(5) The torque is reduced to shift the gearshift lever 9 forward or upward in the Y-axis while shifting it to the right in the X-axis (see step 121).

(5a) The coordinates of the points, where the X-axis actuator 15X which is stopped and then can suddenly start to shift, are memorized as $(X_{12}, Y_{12})$ and $(X_{12}, Y_{10})$ (see steps 122 to 124).

(6) Even after the Y-axis actuator 15Y was stopped, the instruction to the X-axis actuator portion 15X and the Y-axis actuator portion 10Y is continued (see steps 125 and 126).

(6a) If the Y-axis actuator 15Y started to shift forward, the velocity instruction to the X-axis actuator portion 10X is set to $\frac{1}{4}$ (see step 127).

(6b) If the Y-axis actuator 15Y suddenly started an acceleration, the coordinates at that time are memorized as $(X_{21}, Y_{21})$, and the velocity instruction to the X-axis actuator portion 10X is returned to the former value (see steps 128 and 129).

(7) If the X-coordinate of the gearshift lever 9 amounted to $X_{21}-\Delta_1$, the velocity instruction to the X-axis actuator portion 10X is set to zero (see steps 130 to 132).

(7a) If the Y-axis actuator 15Y stopped, its Y-coordinate is memorized as $Y_{02}$ (see steps 133 and 134).

(8) The gearshift lever 9 is shifted to a position of $Y_{02}-\Delta_2$ (see steps 135 and 136).

(8a) The torque is reduced to shift the gearshift lever 9 to the left in the X-axis and a position, where the gearshift lever 9 is stopped, is memorized as $X_L$. The torque is then reduced to shift the gearshift lever 9 to the right in the X-axis, and a position, where the gearshift lever 9 is stopped, is memorized as $X_R$ (see steps 137 to 142).

(8b) $X_{22}$, $D_2$ determined from $X_{22}=(X_L+X_R)/2$ and $D_2=(X_L-X_R)$, respectively, are memorized and the gearshift lever 9 is shifted to a position of $X_{11}$ (see step 143).

(8c) The gearshift lever 9 is shifted forward in the Y-axis and a Y-coordinate $Y_{22}$ of a point, where the gearshift lever 9 became incapable of shifting in the direction of Y-axis, is memorized (see steps 144 to 148).

Here, in the case of the shift pattern (A):

(9) The gearshift lever 9 is shifted rearward in the Y-axis.

(9a) If the Y-coordinate of the gearshift lever 9 became $Y_{02}$ or less, the gearshift lever 9 is shifted so that its X-coordinate may amount to $X_{21}+\Delta$.

In addition, in the cases of the shift patterns (F), (H), and (I):

(9) The torque is reduced to shift the gearshift lever 9 rearward in the Y-axis while shifting it to the right.

(9a) Coordinates of a point, where the X-axis actuator 15X was stopped and then can suddenly start to shift, are memorized as $(X_{24}, Y_{24})$, and the X-axis actuator 15X is shifted to $X_{21}+\Delta$ (see steps 149 to 154).

In addition:

(10) If the Y-axis actuator 15Y was stopped, the X-axis actuator 15X is shifted to the right.

(10a) If the Y-axis actuator 15Y started to shift rearward, coordinates at that time are memorized as $(X_{31}, Y_{31})$, and the velocity instruction to the X-axis actuator 15X is returned to the former value (see steps 155 to 159).

(11) If the coordinate of the X-axis actuator 15X amounted to $X_{22}$, the velocity instruction to the X-axis actuator 15X is set to zero.

(11a) If the Y-axis actuator 15Y was stopped, its Y-coordinate is memorized as $Y_{03}$ (see steps 160 to 164).

(12) The Y-axis actuator 15Y is shifted to a point of $Y_{03}+\Delta_3$ (see steps 165 and 166).

(12a) The torque is reduced to shift the X-axis actuator 15X to the left and a coordinate, where the X-axis actuator 15X is shifted to the right and a coordinate, where the X-axis actuator 15X is stopped, is memorized as $X_R$.

(12b) $X_{33}$, $D_3$ determined from $X_{33}=(X_L+X_R)/2$ and $D_3=(X_L-X_R)$, respectively, are memorized and the gearshift lever 9 is shifted to a point of $X_{33}$ (see steps 167 to 172).

(12c) The gearshift lever 9 is shifted forward in the Y-axis and a Y-coordinate $Y_{33}$ of a point, where the gearshift lever 9 became incapable of shifting in the direction of the Y-axis, is memorized. $X_{23}, X_{32}, Y_{23}, Y_{32}$ determined from $X_{23}=X_{32}=(X_{22}+X_{33})/2$ and $Y_{23}=Y_{32}=(Y_{22}+Y_{33})$, respectively, are memorized (see steps 173 to 178).

(13) $(X_{34}, Y_{34})$, $(X_{35}, Y_{35})$ are obtained in the same procedures as in (5) to (5a).

(14) Data of $(X_{43}, Y_{43})$, $(X_{42}, Y_{42})$ are obtained in the same procedures as in (6) to (6a).

(15) $Y_{04}$ is determined in the same procedures as in (7) to (7b).

(16) $X_{44}, Y_{44}, D_4$ are determined in the same procedures as in (8) to (8c).

(17) Data of $(X_{46}, Y_{46})$ are determined in the same procedures as in (9) to (9a).

(18) Data of $(X_{53}, Y_{53})$ are determined in the same procedures as in (10) to (10a).

(19) $Y_{05}$ is determined in the same procedures as in (11) to (11a).

(20) $(X_{55}, Y_{55})$, $D_5$ are determined in the same procedures as in (12) to (12c), and also $(X_{45}, Y_{45})$, $(X_{54}, Y_{54})$ are determined.

(21) $(X_{56}, Y_{56})$, $(X_{65}, Y_{65})$, $(X_{66}, Y_{66})$, $D_6$, $(X_{57}, Y_{57})$, $(X_{75}, Y_{75})$, $(X_{77}, Y_{77})$, $D_7$, $(X_{67}, Y_{67})$, $(X_{76}, Y_{76})$ are determined in the same procedures as in (13) to (20).

(22) If coordinates of a top were determined, X, Y-coordinates are shifted to an intermediate point between said top and the preceding shift position.

(22a) Subsequently, an X-coordinate is shifted to a position $X_{TN}$ of one-half times a sum of a value of the top and a value of a position lower than the top by two steps $\{=(X_{TT}+X_{T-2, T-2})/2\}$, and a Y-coordinate is shifted back and forth to determine a front stop coordinate $Y_{FT}$ and a rear stop coordinate $Y_{RT}$.

(22b) In addition, said X-coordinate is shifted to a position $X_{1N}$ of one-half times a sum of the first value and the third value $\{=(X_{11}+X_{33})/2\}$ to determine a front stop coordinate $Y_{F1}$ and a rear stop coordinate $Y_{R1}$.

(22c) An N position is determined from $Y_{00}=(Y_{FT}+Y_{RT}+Y_{F1}+Y_{R1})/4$. $D_0=\{(Y_{FT}-Y_{RT})+(Y_{F1}-Y_{R1})\}/2$ and $X_{00}=(X_{1N}+X_{TN})/2$, and the gearshift lever 9 is shifted to $(X_{00}, Y_{00})$.

(23) Said data obtained in (1) to (22) are converted into a coordinate system with $(X_{00}, Y_{00})$ as a fundamental point, and also a reading of the coordinates of the shift positions is converted into (0, 0).

[2] The case of the shift patterns (B), (E):

(24) The gearshift lever 9 is shifted to the left and then shifted in the procedures of (1), (1a), (2) to determine $X_{01}$.

(25) The gearshift lever 9 is shifted forward to determine $Y_{01}$ in the procedure of (3a).

(26) The gearshift lever 9 is shifted to a position of $Y_{01}-\Delta_2$ to determine $X_{11}$, $D_1$ in the procedures of (4a), (4b) (refer to (8) to (8b)).

(27) The gearshift lever 9 is shifted forward to determine $Y_{11}$ (refer to (8c)).

(28) Subsequently, the respective coordinates are determined in the procedures of (9), (9a) and thereafter.

[3] The case of the shift patterns (C), (D), (G):

(29) The gearshift lever 9 is shifted to the left and then shifted in the procedures of (1), (1a), (2) to determine $X_{01}$.

Here, in the case of the shift pattern (C):

(30) The gearshift lever 9 is shifted forward to confirm the possibility of shifting by 20 cm or more. When the gearshift lever 9 cannot shift by 20 cm or more, said instruction of shifting the X-axis actuator 15Y forward is continued and the X-axis actuator 15X is shifted to the right to determine $(X_{01}, Y_{01})$ in the procedures of (6), (6a), (6b).

In addition, in the case of the shift patterns (D), (G):

(30) The gearshift lever 9 is shifted rearward to confirm the possibility of shifting by 20 cm or more. When the gearshift lever 9 cannot shift by 20 cm or more, said instruction of shifting the Y-axis actuator 15Y rearward is continued and the X-axis actuator 15X is shifted to the right to determine $(X_{01}, Y_{01})$ in the procedures of (9) (9a).

(31) The gearshift lever 9 is shifted to a position of $X_{01}-\Delta$ to determine the respective coordinates in the procedures of (25a) and thereafter.

As above-described, according to the present invention, the driving robot learns by confirming the shift positions of the gearshift lever in the above-appointed procedures, so that anyone can teach the driving robot even though not experienced in this art. The same result is obtained regardless of the operator, so that there is no teaching failure. Thus, the changed-speed operation can be surely conducted and the desired vehicle driving test can be conducted.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for automatically operating transmission gear and clutch shifting controls of a vehicle, comprising:

drive means for automatically activating operator controls of the transmission gear and clutch, including a manual gearshift lever;

computer means for controlling the drive means during an initial determination of the operative displacement of the gearshift lever, including means for repetitively moving the gearshift lever to determine an operative displacement both along a path of movement which causes a shifting of gears and traverse to the path of movement for the shifting of gears, first means for adjusting the position of the gearshift lever relative to a maximum traverse movement by a predetermined amount, and means for storing the operative displacement values, including the adjusted position values, to enable an automatic gear shifting of a manual transmission.

2. The invention of claim 1 wherein the means for automatically activating includes a first motor for driving the gearshift lever in an X direction, a second motor for driving the gearshift lever in a Y direction, perpendicular to the X direction, and sensors for monitoring the position of the first and second motors.

3. The invention of claim 2, further including second means for adjusting the position of the gearshift lever relative to the maximum movement along the path of movement by a predetermined amount.

4. The invention of claim 2, further including means for varying the speed of the first motor based on movement of the second motor.

5. A method of determining the automatic operation of transmission gear controls of a vehicle having means for automatically activating operator controls of the transmission gears, including a manual gearshift lever having a shift pattern that can be represented in an X-Y coordinate system, comprising the steps of:

repetitively moving the gearshift lever to determine an operative displacement of the gearshift lever in the shift pattern, both in a movement along the shift pattern and traverse to the shift pattern;

adjusting the maximum limits of movement along the shift pattern and traverse to the shift pattern by a predetermined amount, and memorizing the adjusted limits to define X, Y coordinates in the shift pattern.

6. The method of claim 5, further including the step of varying the relative speed of movement in the X direction to a lesser value when movement starts in the Y direction.

7. An apparatus for automatically operating operator transmission gear controls of a vehicle to determine a gearshift lever position, comprising:

drive means for automatically activating operator controls of the transmission gears, including a manual gearshift lever;

computer means for controlling the drive means during an initial determination of the operative displacement of the gearshift lever, both along a path of movement which causes a shifting of gears and traverse to the path of movement for the shifting of gears, and means for storing spatial positions of the gearshift lever at predetermined positions along the gearshift lever movement, in order to enable a subsequent automatic gearshift lever movement.

8. The invention of claim 7, further including means for determining when a limit of travel along an XY-axis coordinate system occurs for the gearshift lever to enable the storage of a spatial position.

9. The invention of claim 8, further including means for adjusting the position of the gearshift lever relative to a maximum limit of travel by a predetermined amount.

10. The invention of claim 8, wherein the drive means includes a first motor for driving the gearshift lever in a Y-axis and a first sensor determining a Y position, and a second motor for driving the gearshift lever in an X-axis and a second sensor for determining an X position.

11. The invention of claim 10, further including means for varying the speed of the first motor based on movement of the second motor.

12. The invention of claim 11, wherein the means for varying changes the relative speed of movement in the X direction to a lesser value when movement starts in the Y direction.

13. A transmission gear lever control system for automatically operating operator transmission gear controls of a vehicle, comprising:
   drive means for automatically activating operator controls of the transmission gears, including a manual gearshift lever;
   computer means for controlling the drive means during an initial determination of the operative displacement of the gearshift lever, both along a path of movement which causes a shifting of gears and traverse to the path of movement for the shifting of gears, including,
   first means for adjusting the position of the gearshift lever relative to a maximum traverse movement by a predetermined amount, to provide an operative displacement value,
   second means for adjusting the position of the gearshift lever relative to the maximum movement along the path of movement by a predetermined amount, to provide an operative displacement value, and
   means for storing the operative displacement values to enable an automatic gear shifting of a manual transmission.

14. The invention of claim 13, further including means for adjusting the position of the gearshift lever relative to a maximum limit of travel by a predetermined amount.

15. The invention of claim 13, wherein the drive means includes a first motor for driving the gearshift lever in a Y-axis and a first sensor determining a Y position, and a second motor for driving the gearshift lever in an X-axis and a second sensor for determining an X position.

16. The invention of claim 15, further including means for varying the speed of the first motor based on movement of the second motor.

17. The invention of claim 16, wherein the means for varying changes the relative speed of movement in the X direction to a lesser value when movement starts in the Y direction.

* * * * *